Figure 1:
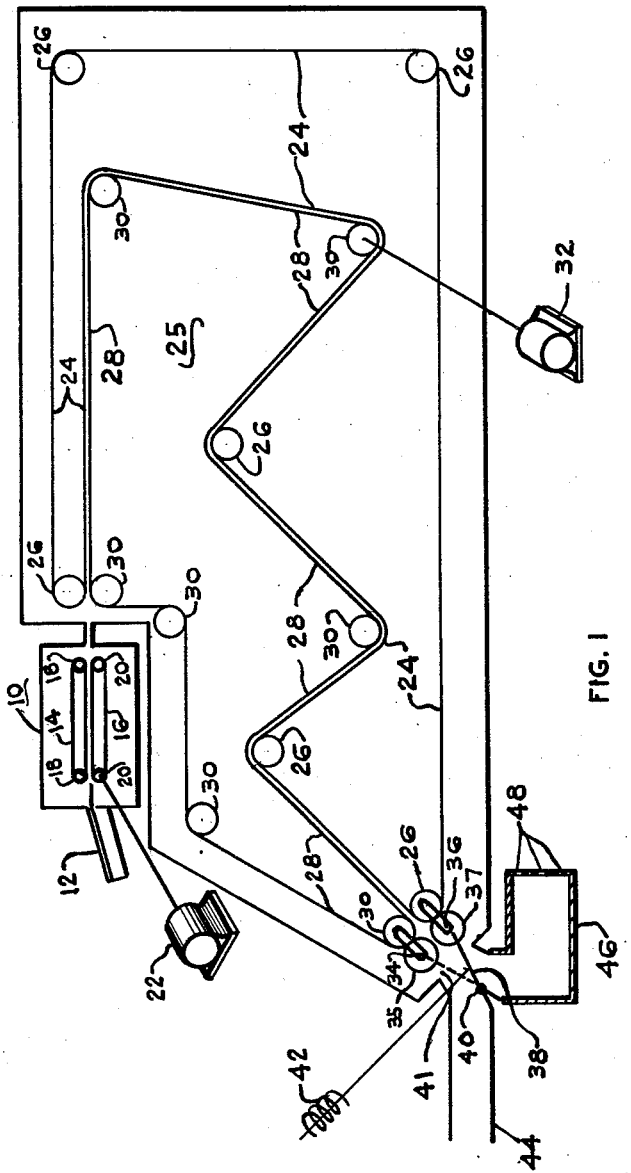

Oct. 29, 1963   R. G. ELLIS ETAL   3,108,680
CURRENCY DETECTORS

Filed June 13, 1960   3 Sheets-Sheet 1

INVENTORS
RAY G. ELLIS
BY FRANCIS T. VACCARO

*Rey Eilers*
ATTORNEY

Oct. 29, 1963 R. G. ELLIS ETAL 3,108,680
CURRENCY DETECTORS
Filed June 13, 1960 3 Sheets-Sheet 2

INVENTORS.
RAY G. ELLIS
BY FRANCIS T. VACCARO

ATTORNEY

Oct. 29, 1963  R. G. ELLIS ETAL  3,108,680
CURRENCY DETECTORS
Filed June 13, 1960  3 Sheets-Sheet 3

INVENTORS
RAY G. ELLIS
FRANCIS T. VACCARO
BY Ray Eilers
ATTORNEY.

United States Patent Office 3,108,680
Patented Oct. 29, 1963

3,108,680
CURRENCY DETECTORS
Ray G. Ellis, Hanley Hills, and Francis T. Vaccaro, Pagedale, Mo., assignors to National Rejectors, Inc., St. Louis, Mo., a corporation of Missouri
Filed June 13, 1960, Ser. No. 35,623
12 Claims. (Cl. 198—31)

This invention relates to improvements in currency detectors. More particularly, this invention relates to improvements in currency detectors which are used with machines that vend articles, commodities or services.

It is therefore an object of the present invention to provide a currency detector which can be used with machines that vend articles, commodities or services.

Many vending machines are designed and built in such a way that the patrons must first insert their money and then subsequently select the articles, commodities or services which they desire. Such vending machines should be equipped with devices that receive, and temporarily hold, the money inserted by the patrons; and those devices must subsequently direct that money back to the patrons or direct that money to the cash boxes of those machines. Specifically, if patrons insert money in vending machines and then subsequently decide that they do not want the articles, commodities or services which they originally desired, those devices must direct that money back to those patrons. Also, if patrons insert money in vending machines and those vending machines can not supply the desired articles, commodities or services, because of exhaustion of the supply of those articles, commodities or services, or otherwise, those devices must direct that money back to those patrons. However, if the patrons select and receive the articles, commodities or services which they desire, those devices must direct the inserted money to the cash boxes of those vending machines.

Where the money that is inserted is in the form of coins, it is a relatively simple matter to provide a device, appropriately referred to as an escrow, that can receive and temporarily hold that money; because coins are small, they are resistant to deformation, and they have sufficient weight to move surely and quickly in response to gravity. However, where the money that is inserted is in the form of paper currency, it is very difficult to provide an escrow that can receive and temporarily hold that money; because paper currency is large in area, it is readily bent and crumpled, and it is light in weight. Yet, it would be desirable to provide an escrow that could receive and temporarily hold paper currency. The present invention provides such as escrow; and it is therefore an object of the present invention to provide an escrow that can receive and temporarily hold paper currency.

The escrow provided by the present invention includes elongated belts that have their leading edges adjacent the outlet of a currency detector. Whenever the currency detector accepts an inserted bill, it will act, through a control device, to set the elongated belts in motion; and it will then move that inserted bill into engagement with the leading edges of those belts. Those belts will grasp the leading edge of that bill and move it away from the outlet of the currency detector a distance just slightly greater than the length of that bill. Thereafter those belts will come to rest; and they will remain at rest until a further bill is accepted by the currency detector, until a selection is made and the desired article, commodity or service is vended, or the patron changes her mind and actuates a "return" switch. In this way, a bill that has been accepted by a currency detector can have its leading edge grasped and moved away from the outlet of that currency detector and can then be temporarily held stationary. It is therefore an object of the present invention to provide elongated belts that have their leading edges adjacent a currency detector, that can grasp the leading edge of a bill accepted by that currency detector, and that can move that leading edge of that bill away from the outlet of that currency detector a distance just slightly greater than the length of that bill and then come to rest.

In the event a further bill is accepted by the currency detector, that currency detector will again act, through the control device, to set the elongated belts in motion; and those belts will then grasp the leading edge of that further bill and move it away from the outlet of the currency detector a distance just slightly greater than the length of that further bill. That further bill will be held in tandem relation to the first bill, and the leading edge of that further bill will trail the trailing edge of the first bill by a short distance. Still further bills may be accepted by the currency detector, and those still further bills will be successively grasped by the elongated belts and moved short distances away from the outlet of the currency detector. Those still further bills will be spaced along the lengths of the elongated belts; and each bill will trail its predecessor by a short distance. It is therefore an object of the present invention to provide elongated belts that have their leading edges adjacent a currency detector, that can successively grasp a number of bills successively accepted by the currency detector, and that can hold those bills in tandem with the leading edge of each bill trailing the trailing edge of the preceding bill by a short distance.

If a selection is made and if the desired article, commodity or service is vended, the elongated belts will be set in motion and a diverter will be set in position to divert the bills to the cash box of the vending machine. The leading edge of that diverter is disposed adjacent the trailing edges of the elongated belts, and the entrance to the cash box of the vending machine and the entrance to an open money receptacle are disposed adjacent the trailing edge of that diverter. The movement of the elongated belts will enable those belts to deliver the bills, held between those belts, to the diverter; and that diverter will then direct those bills into the cash box of the vending machine. Those belts will remain in motion until they have moved a distance greater than the lineal distance between their leading edges and their trailing edges; and, as a result, those belts will deliver all of the bills held between them to the diverter and thus to the cash box. It is therefore an object of the present invention to provide elongated belts that can receive and temporarily hold bills and that can subsequently move those bills to a diverter which will direct those bills into the cash box of a vending machine.

If a patron changes her mind, or if the vending machine can not supply the desired article, commodity or service, the patron will then close a "return" switch; and thereupon the elongated belts will be set in motion and the diverter will be disposed to direct bills to the open money receptacle. Those belts will remain in motion until they have moved a distance greater than the lineal distance between their leading edges and their trailing edges; and, as a result, those belts will deliver all of the bills held between them to the diverter and thus to the open money receptacle. The patron can then reach into that money receptacle and recover the bills which she had inserted. It is therefore an object of the present invention to provide elongated belts that can receive and temporarily hold bills and that can subsequently move those bills to a diverter which will direct those bills into an open money receptacle of a vending machine.

The bills which are grasped and moved by the elongated belts are fixedly and positively held by, and between, the confronting faces of those belts. As a result, those bills are kept from becoming lost. The elongated belts positively confine and guide the bills until those bills are directed either to the cash box or to the open money receptacle of the vending machine. In this way, the owner of the vending machine and the patrons of that vending machine are all protected against any loss of bills. It is therefore an object of the present invention to provide elongated belts that receive bills and that positively hold those bills in tandem relation between the confronting faces of those belts until those bills are directed to the cash box or to the open money receptacle of the vending machine.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
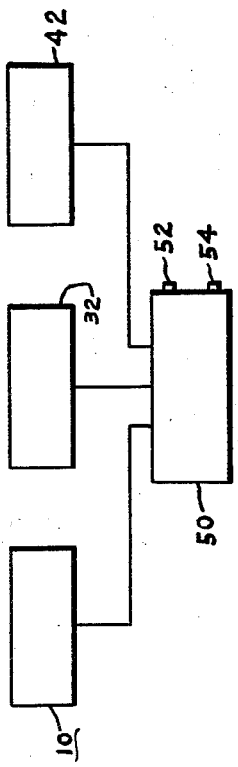
Figure 4:
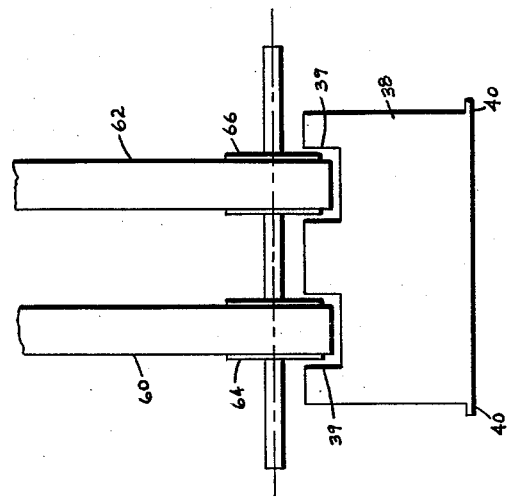
Figure 3:
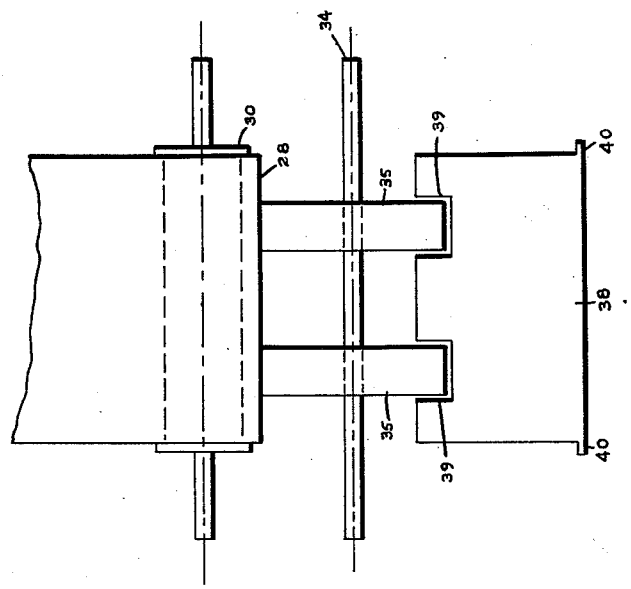
Figure 5:
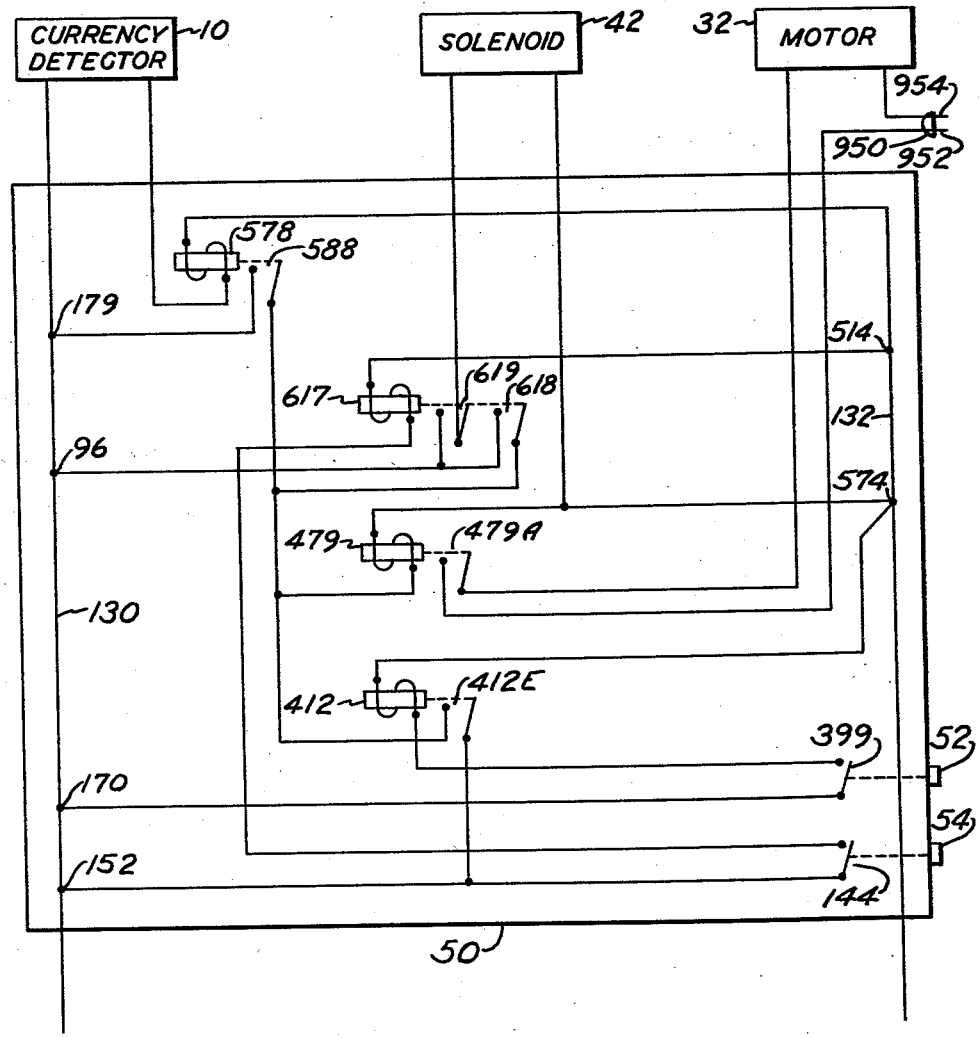

In the drawing, FIG. 1 is a schematic side view of a currency detector and of an escrow which receives bills accepted by that currency detector and which selectively directs those bills toward a cash box or toward an open money receptacle, FIG. 2 is a block diagram of the control circuit for the escrow of FIG. 1, FIG. 3 is a plan view, on a larger scale, of the diverter and of the trailing edges of one of the belts of the escrow of FIG. 1, FIG. 4 is a plan view of an alternate form of diverter used with an alternate form of escrow belts, and FIG. 5 is a simplified schematic diagram of the pertinent circuits of the control device of FIG. 2.

Referring to the drawing in detail, the numeral 10 generally denotes a currency detector. That currency detector has a platform 12 at the exterior thereof, and bills will be laid on that platform before they are drawn into that currency detector. That currency detector has belts 14 and 16; and pulleys 18 and 20 suitably support and guide those belts. An electric motor 22 is suitably connected to one of the pulleys 20 to apply rotative forces to that pulley. Those rotative forces will rotate that pulley in the clockwise direction; and those rotative forces will, either through the direct engagement of the belts 14 and 16 or through a belted or geared connection between a pulley 20 with a pulley 18, cause the pulleys 18 to rotate in the counter clockwise direction. The overall result is that the confronting faces of the belts 14 and 16 normally move from left to right in FIG. 1.

The leading edges of the belts 14 and 16 will grasp bills which are placed on the platform 12 and which have their leading edges moved inwardly of the currency detector; and those belts will move those bills toward the outlet of that currency detector, moving those bills relative to a detection mechanism, not shown, as they do so. If a bill is accepted, the belts 14 and 16 will move that bill to and through the outlet at the right-hand end of the currency detector 10 in FIG. 1. However, if a bill is not accepted, the motor 22 will briefly come to rest and will then rotate in the opposite direction to move the confronting faces of the belts 14 and 16 from right to left. As a result, bills that are not accepted will be moved back to the left and will be again placed upon the platform 12, where they can be retrieved by the patron.

The numeral 25 generally denotes an escrow which can receive and temporarily hold bills that have been accepted by the currency detector 10. That escrow includes an elongated belt 24 which has the leading edge thereof adjacent, and in general registry with, the right-hand ends of the belts 14. The belt 24 is wider than either of the belts 14, and it will preferably be about as wide as an authentic bill. The belt 24 is suitably passed around, and is suitably supported and guided by, rotatable pulleys 26. That belt is made long enough to help support all of the bills that are to be held in escrow at any one time. In one preferred embodiment of the present invention the belt 24 is made long enough to help support a total of nine one dollar bills in tandem. The numeral 28 denotes a second belt which is substantially as long as the belt 24; and pulleys 30 fully support and confine the belt 28. The leading edge of the belt 28 is adjacent, and in general registry with, the trailing edges of the belts 16. The belt 28 is wider than either of the belts 16, and it is preferably about as wide as an authentic bill. The pulleys 26 and 30 hold the belts 24 and 28 immediately adjacent each other for distances exceeding half of the lengths of those belts, all as shown by FIG. 1. The belts 24 and 28 are readily flexible, and they have surfaces which enable them to grip and hold bills.

The belts 24 and 28 are preferably made of a rubberized fabric. One rubberized fabric that has been found to be useful is Suprene white belting with a T-P rough top. Such belts provide full and adequate gripping of the bills but readily release those bills when those belts diverge. Those belts are two and three quarter inches wide, and they are preferably made as two-ply belts. The two and three quarter inch width of the belts 24 and 28 enables those belts to extend beyond the elongated sides of normal bills, thereby assuring full protection for those bills as long as they are held between those belts.

The numeral 32 denotes an electric motor which is suitably geared or belted to one of the pulleys 30. That motor will drive the belt 28 in such a way that the horizontally-directed upper portion of that belt will move from left to right in FIG. 1. The belt 28 can drive the belt 24 by reason of the engagement of the confronting faces of those belts or, if desired, the motor 32 can be belted or geared to a pulley 26 as well as to a pulley 30. The movement of the belts 24 and 28 will enable the leading edges of those belts to grasp a bill that issues from the outlet of the currency detector 10 and to move that bill to the right.

The pulleys 26 and 30 are mounted within the housing of the escrow 25 in such a way as to cause the belts 24 and 28 to assume, in part, a serpentine configuration. Such a configuration is important because it makes it possible to dispose considerable lengths of the belts 24 and 28 within the small space, and because it causes the belts 24 and 28 to engage each other intimately along their lengths. The overall result is that a considerable number of bills can be confined and held between the belts 24 and 28, and those bills will be fully and tightly gripped by those belts.

One of the pulleys 26 and one of the pulleys 30 will be mounted on supports that can move relative to the housing of the escrow 25. Those supports will be suitably urged by springs to move toward belt-tightening position; and those supports and the pulleys thereon will compensate for any extensions or retractions of the belts 24 and 28.

The numeral 34 denotes a shaft which is mounted for rotation adjacent that pulley 30 which is adjacent the trailing edge of the belt 28. A similar shaft 36 is mounted for rotation adjacent that pulley 26 which is adjacent the trailing edge of the belt 24. The shafts 34 and 36 are suitably belted or geared to the adjacent pulleys 30 and 26, respectively. The shaft 34 is equipped with two rotary wire brushes 35, as shown by FIG. 3; and those brushes are dimensioned so they engage and bear lightly against the portion of belt 28 which diverges from the belt 24. The brushes 35 are spaced apart axially of the shaft 34; but they are close enough so both of them can simultaneously engage a bill. The shaft 36 is equipped with two rotary wire brushes 37; and those brushes are dimensioned so they engage and bear lightly against the portion of belt 24 which diverges from the belt 28. The brushes 37 are spaced apart axially of the shaft 36; but they are close enough so both of them can simultaneously engage a bill. The brushes 35 and 37 are in register with each other but have their confronting faces spaced apart about a quarter of an inch, thereby facilitating the free passage of bills between those brushes.

The shaft 34 and the adjacent pulley 30 will both rotate in the clockwise direction; and this means that the peripheries of the brushes 35 will be moving downwardly as they approach the belt 28. That belt will be moving upwardly as it approaches the brushes 35, and hence there will be an active brushing of the surface of the belt 28 by the brushes 35. The shaft 36 and the adjacent pulley 26 will both rotate in the counter clockwise direction; and this means that the peripheries of the brushes 37 will be moving upwardly as they approach the belt 24. That belt will be moving downwardly as it approaches the brushes 37, and hence there will be an active brushing of the surface of the belt 24 by the brushes 37. The overall result is that if a bill tends to curl and to follow either of the belts 24 or 28 as those belts diverge from each other, the brushes 37 or the brushes 35 will force the leading edge of that bill to move away from that belt. Further, those brushes will force that bill to move downwardly toward the opening 41 in the lower left-hand corner of the housing for the escrow 25.

An open money receptacle 44 has the entrance thereof adjacent to, and in communication with, the opening 41 at the lower left-hand corner of the housing for the escrow 25. The other end of that receptacle is open and extends to the exterior of the vending machine; and hence a patron can easily reach into that receptacle and recover any bills that pass through the opening 41 and enter that money receptacle. A cash box 46 has the entrance thereof adjacent to, and in communication with, the opening 41 in the housing for the escrow 25. That cash box will be suitably locked so only authorized persons can open it to remove bills from it. That cash box has openings 48 in the wall thereof; and those openings permit air, that is being moved by a bill entering that cash box, to pass freely from that cash box. As a result, the openings 48 facilitate the ready entry of bills into the cash box 46. It will be noted that the entrance to the money receptacle 44 and that the entrance to the cash box 46 are located below the levels of the diverging trailing edges of the belts 24 and 28. Further, it will be noted that those entrances are substantially in line with those portions of the belts 24 and 28 which lead to the trailing edges of those belts. As a result, bills leaving those belts have substantially straight, gravity-aided paths to follow in passing to the money receptacle 44 or to the cash box 46.

The numeral 38 denotes a diverter that is lodged within the opening 41 at the lower left-hand corner of the housing for the escrow 25. That diverter has ears 40 thereon, and those ears serve as pivots for that diverter. Those ears are adjacent the trailing edge of the diverter 38, and those ears hold that trailing edge intermediate the entrances of money receptacle 44 and of cash box 46. The leading edge of the diverter 38 has notches 39 therein; and those notches accommodate the brushes 35 or the brushes 37. As a result, the leading edge of the diverter 38 can extend inwardly beyond the peripheries of the brushes 35 or inwardly beyond the peripheries of the brushes 37. Whenever the leading edge of the diverter 38 extends inwardly beyond the peripheries of the brushes 37, as shown by solid lines in FIG. 1, that diverter will block the entrance of the cash box 46 and thereby force all bills to pass to the money receptacle 44. However, when the leading edge of the diverter 38 extends inwardly beyond the peripheries of the brushes 35, as shown by dotted lines in FIG. 1, that diverter will block the entrance of the money receptacle 44 and thereby force all bills to pass to the cash box 46. In addition, whenever the leading edge of the diverter 38 extends inwardly beyond the peripheries of the brushes 37, that diverter will keep bills from curling around and following the peripheries of the brushes 37. Similarly, whenever the leading edge of the diverter 38 extends inwardly beyond the peripheries of the brushes 35, that diverter will keep bills from curling around and following the peripheries of the brushes 35. In these ways, the diverter 38 positively keeps bills from getting lost adjacent the opening 41 in the housing of the escrow 25.

A solenoid 42 has the plunger thereof connected to the diverter 38, and that solenoid is normally de-energized. As a result, the diverter 38 normally lies in the position shown by dotted lines in FIG. 1. However, whenever that solenoid is energized, it will shift the diverter 38 down to the position shown by solid lines in FIG. 1. In this way, the solenoid 42 determines whether bills are directed into the money receptacle 44 or enter the cash box 46.

As the belts 24 and 28 move bills toward the opening 41, adjacent the lower left-hand corner of the housing of the escrow 25, those bills will pass between the brushes 35 and 37 and move toward the diverter 38. If that diverter is in its lower position, the bills will pass downwardly and into the money receptacle 44; but if that diverter is in its upper position, the bills will pass downwardly and into the cash box 46.

The numeral 50 denotes a control device which will be suitably connected to the detection mechanism, not shown, of the currency detector 10, which will be suitably connected to a machine that vends articles, commodities or services, which is suitably connected to the motor 32, and which is suitably connected to the solenoid 42. Such a control device will accumulate credits equivalent to the value of all bills that are accepted by the currency detector 10 and will cause the value of those bills to be displayed on dials or other "read out" devices. That control device will also be suitably connected to empty switches in the vending machine and to suitable empty switches in a change-dispensing device, not shown. The control device 50 is a very complex device, and many of the control functions which are provided by that control device are utilized by components which are not a part of the present invention. However, the control device 50 does selectively supply power to the motor 32 and does selectively supply power to the solenoid 42. The control device 50 also is suitably connected to a selection switch 399 operated by a selection button 52, and is suitably connected to a return switch 144 operated by a return button 54; and FIG. 5 shows, in simplified fashion, those circuits of that control device which are pertinent to the operation of motor 32 and solenoid 42. Co-pending application Serial No. 114,966 of Clifford B. Adams for "Money-Actuated Devices" which was filed on June 5, 1961, discloses one control device that has been used with the bill escrow of FIG. 1.

Referring to FIG. 5 in detail, the numeral 130 denotes a conductor which can be connected to one terminal of a source of power, and the numeral 132 denotes a second conductor which can be connected to a second terminal of that source of power. The numeral 578 denotes a relay coil; and the numeral 588 denotes normally-open contacts controlled by that relay coil. One terminal of that relay coil is connected to one terminal of the currency detector 10, and the other terminal of that relay coil is connected to the conductor 132. A second terminal of that currency detector is connected to the conductor 130 by a junction 179. The stationary contact 588 is connected to the conductor 130 by the junction 179; and the movable contact 588 is connected to one terminal of a relay coil 479. The other terminal of that relay coil is connected to the conductor 132 by a junction 574. Normally-open contacts 479A are controlled by the relay coil 479; and the movable contact 479A is connected to one terminal of motor 32, while the stationary contact 479A is connected to prong 952 of a male plug 950. The other terminal of the motor 32 is connected to prong 954 of that male plug; and that male plug will be set in a receptacle which is connected to a suitable source of power. The numeral 617 denotes a relay coil; and the numerals 618 and 619 denote normally-open contacts controlled by that relay coil. One terminal of the relay coil 617 is connected to one terminal of the return switch 144, and the other terminal of that relay coil is connected to the conductor 132 by a junction 514. The other terminal of the return switch 144 is connected to the conductor 130 by a junction 152. The stationary contacts 619 and 618 are both connected to the conductor 130 by a junction 96; and the movable contact 619 is connected to one terminal of the solenoid 42, while the movable contact 618 is connected to the said one terminal of the relay coil 479. The other terminal of the solenoid 42 is connected to the conductor 132 by the junction 574. The numeral 412 denotes a relay coil which has one terminal thereof connected to the conductor 132 by the junction 574; and the other terminal of that relay coil is connected to one terminal of the selection switch 399. The other terminal of that switch is connected to the conductor 130 by a junction 170. Normally-open contacts 412E are controlled by the relay coil 412; and the stationary contact 412E is connected to the said one terminal of the relay coil 479, and the movable contact 412E is connected to the conductor 130 by the junction 152. An arrangement, not shown, will be provided which will, when the selection button 52 is pressed, keep the motor 32 energized for a period of time sufficient to enable the belts 24 and 28 to move distances greater than the linear distances along the surfaces of those belts from their leading edges to their trailing edges. That arrangement will, when the return button 54 is pressed, keep both the motor 32 and the solenoid 42 energized for a period of time sufficient to enable the belts 24 and 28 to move distances greater than the linear distances along the surfaces of those belts from their leading edges to their trailing edges. While the arrangement disclosed in the said Adams application is preferred, other arrangements could be used.

If a patron inserts a bill in the currency detector 10, and if that bill is accepted, the control device 50 will receive a signal from the currency detector 10 which will enable that control device to energize the motor 32. Specifically, current will flow from conductor 130 via junction 179, currency detector 10, and relay coil 578 to the conductor 132; and the resulting energization of that relay coil will close the contacts 588. Thereupon, current will flow from conductor 130 via junction 179, contacts 588, relay coil 479, and junction 574 to the conductor 130. The resulting energization of relay coil 479 will close the contacts 479A and will cause current to flow from prong 952 of plug 950 via contacts 479A and the motor 32 to the prong 954. That motor will not be held energized very long, but it will be held energized long enough to cause the belts 24 and 28 to grasp the leading edge of the bill issuing from the outlet of the currency detector 10 and to move that edge away from that outlet a distance just greater than the length of that bill. As a result, when the belts 24 and 28 come to rest, the trailing edge of the inserted bill will be located just a short distance to the right of the pulleys 26 and 30 which are adjacent the outlet of the currency detector 10. That bill will be firmly held between, and confined by, the belts 24 and 28. The belts 24 and 28 will move at the same rate at which the belts 14 and 16 of the currency detector 10 move, but they will, because of the momentum of the belts 24 and 28 and of the pulleys 26 and 30, continue to move for a short period of time after the belts 14 and 16 of the currency detector 10 have come to rest. In this way, the belts 24 and 28 are enabled to move the inserted bill the required distance away from the outlet of the currency detector.

If a further bill is introduced into the currency detector 10, and if that further bill is accepted, the control device 50 will again receive a signal from the currency detector 10 which will enable that control device to energize the motor 32 for a short period of time. That motor will cause the belts 24 and 28 to move short distances; and, as they do so, those belts will grasp the leading edge of that further inserted bill and move it away from the outlet of the currency detector 10 a distance slightly greater than the length of that bill. That further inserted bill will be disposed to the left of the first bill and will be in tandem with it. Both bills will be firmly gripped by, and will be held between, the belts 24 and 28.

Additional bills can be inserted in the currency detector 10 and those additional bills will be successively grasped, and moved short distances by, the belts 24 and 28. The various inserted bills will be held in tandem between the confronting faces of the belts 24 and 28, and those bills will be spaced short distances apart along the lengths of those belts. Those belts will be enabled, because of the serpentine configuration of appreciable portions thereof, to apply intimate holding forces to those various bills.

If a patron changes her mind and decides that she does not want the article, commodity or service she originally desired, or if the vending machine is unable to supply the desired article, commodity or service, the patron will then press the return button 54. Thereupon, the control device 50 will energize the solenoid 42 and the motor 32 and will hold that solenoid and motor energized for a period of time sufficient to enable the belts 24 and 28 to move distances greater than the lineal distances along the surfaces of those belts from their leading edges to their trailing edges. Specifically, current will flow from conductor 130 via junction 152, money return switch 144, relay coil 617, and junction 514 to the conductor 132. The resulting energization of that relay coil will close the contacts 618 and 619. The closing of the contacts 619 will cause current to flow from conductor 130 via junction 96, contacts 619, solenoid 42, and junction 574 to conductor 132; and the diverter 38 will move from its upper position to its lower position. The closing of the contacts 618 will cause current to flow from conductor 130 via junction 96, contacts 618, relay coil 479, and junction 574 to the conductor 130. The resulting energization of relay coil 479 will close the contacts 479A and will cause current to flow from prong 952 of plug 950 via contacts 479A and motor 32 to the prong 954. Thereupon the motor 32 will become energized and start moving the belts 24 and 28. As the belts 24 and 28 move, the trailing edges thereof will continuously diverge at the pulleys 26 and 30 which are adjacent the opening 41; and as the trailing edges of those belts diverge, they will free the bills which were held by those belts and will cause those bills to pass toward the opening 41. The diverter 38 will be in the position shown by solid lines in FIG. 1 and thus will guide the bills into the money receptacle 44. Subsequently, the motor 32 and the solenoid 42 will be de-energized by the control device 50. The patron can then extend her hand into that receptacle and retrieve the bills which she inserted in the currency detector 10.

If the patron presses the selection button 52, and if the vending machine vends the desired article, commodity or service, the control device 50 will energize the motor 32. The diverter 38 will be in its upper position and will keep the bills from passing to the money receptacle 44 and will thus force those bills to pass to the cash box 46. The control device 50 will keep the motor 32 energized for a period of time sufficient to enable the belts 24 and 28 to move distances greater than the lineal distances along the surfaces of those belts from their leading edges to their trailing edges. Specifically, current will flow from conductor 130 via junction 170, selection switch 399, relay coil 412, and junction 574 to conductor 132. The resulting energization of that relay coil will close the contacts 412E; and current will flow from conductor 130 via junction 152, contacts 412E, relay coil 479, and junction 574 to the conductor 130. The resulting energization of relay coil 479 will close the contacts 479A and will cause current to flow from prong 952 of plug 950 via contacts 479A and motor 32 to the prong 954. Thereupon that motor will become energized and start moving the belts 24 and 28. As a result, all bills which are held between the belts 24 and 28 will be moved toward the opening 41 and will be released by the belts 24 and 28. All of those bills will pass to the diverter 38 and be directed into the cash box 46. The control device 50 can also actuate a change-dispensing device, not shown, if change is due the patron.

At the end of a pre-determined period of time, the control device 50 will de-energize the motor 32. At this time, the current detector 10 and the escrow 25 will be ready to accept further bills.

Referring to FIG. 4, the numerals 60 and 62 denote belts that can be used in lieu of the belt 28. Two similar belts, not shown, could be used in lieu of the belt 24. Where such belts are used, the brushes 35 and 37 can be eliminated; and the diverter 38 can be set immediately adjacent the pulleys 64 and 66 and their counterparts. That diverter will fully prevent bills from curling around and following the belts 60 and 62 and their counterparts.

Whereas the drawing and accompanying description have shown and described two preferred embodiments of the present invention, it should be apparent to those skilled in the art that various changes may be made in the form of the invention without affecting the scope thereof.

What we claim is:

1. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding the greater portions of the lengths of said belts in intimate confronting engagement, said pulleys providing a serpentine configuration for parts of said belts, a motor to drive said belts, a diverter, a member to move said diverter, said cash box and said money receptacle having the entrances thereof disposed below the levels of the trailing edges of said belts, said cash box and said money receptacle having the said entrances thereof substantially in line with those portions of said belts which lead to said trailing edges of said belts, said diverter having the trailing edge thereof disposed adjacent but intermediate the said entrances of said cash box and said money receptacle and having the leading edge thereof extending toward said trailing edges of said belts, said diverter being movable to one position to block said entrance of said cash box and to unblock said entrance of said money receptacle, said diverter being movable to a second position to block the entrance of said money receptacle and to unblock said entrance of said cash box, and a control device that selectively energizes said motor and that selectively energizes said member, said control device being adapted to energize said motor for short periods of time to enable said belts to grasp the leading edges of bills accepted by said currency detector and to move said bills away from said outlet of said currency detector distances just slightly greater than the lengths of said bills, said control device also being adapted to energize said motor for periods of time that are long enough for said belts to move distances equal to the linear distances along the surfaces of said belts from said leading edges to said trailing edges of said belts, said control device and said member selectively disposing said diverter in said one or said second position, said cash box having openings therein to permit air moving ahead of bills to escape, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

2. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has a leading edge disposed adjacent said outlet of said currency detector, pulleys that support said belts and that permit said belts to move relative to each other and relative to said currency detector and said cash box and said money receptacle, said pulleys holding the greater portions of the lengths of said belts in intimate confronting engagement, said pulleys providing a serpentine configuration for parts of said belts, a motor to drive said belts, a diverter, a member to move said diverter, said cash box and said money receptacle having the entrances thereof disposed below the levels of the trailing edges of said belts, said diverter having the trailing edge thereof disposed adjacent but intermediate the said entrances of said cash box and said money receptacle and having the leading edge thereof extending toward said trailing edges of said belts, said diverter being movable to one position to block said entrance of said cash box and to unblock said entrance of said money receptacle, said diverter being movable to a second position to block the entrance of said money receptacle and to unblock said entrance of said cash box, and a control device that selectively energizes said motor and that selectively energizes said member, said control device being adapted to energize said motor for short periods of time to enable said belts to grasp the leading edges of bills accepted by said currency detector and to move said bills away from said outlet of said currency detector distances just slightly greater than the lengths of said bills, said control device also being adapted to energize said motor for periods of time that are long enough for said belts to move distances equal to the linear distances along the surfaces of said belts from said leading edges to said trailing edges of said belts, said control device and said member selectively disposing said diverter in said one or said second position, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

3. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money recetacle, said pulleys holding the greater portions of the lengths of said belts in intimate confronting engagement, a motor to drive said belts, a diverter, a member to move said diverter, said cash box and said money receptacle having the entrances thereof disposed below the levels of the trailing edges of said belts, said diverter being movable to one position to block said entrance of said cash box and to unblock said entrance of said money receptacle, said diverter being movable to a second position to block the entrance of said money receptacle and to unblock said entrance of said cash box, and a control device that selectively energizes said motor and that selectively energizes said member, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to move distances equal to the linear distances along the surfaces of said belts from said leading edges to said trailing edges of said belts, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

4. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, said diverter being movable to one position to block said entrance of said cash box and to unblock said entrance of said money receptacle, said diverter being movable to a second position to block the entrance of said money receptacle and to unblock said entrance of said cash box, and a control device, said control device being adapted to energize said motor for short periods of time to enable said belts to grasp the leading edges of bills accepted by said currency detector and to move said bills away from said outlet of said currency detector distances just slightly greater than the lengths of said bills, said control device also being adapted to energize said motor for periods of time that are long enough for said belts to move distances equal to the linear distances along the surfaces of said belts from said leading edges to said trailing edges of said belts, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

5. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, said diverter being movable to one position to block said entrance of said cash box and to unblock said entrance of said money receptacle, said diverter being movable to a second position to block the entrance of said money receptacle and to unblock said entrance of said cash box, and a control device, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to move distances equal to the linear distances along the surfaces of said belts from said leading edges to said trailing edges of said belts, said belts being adapted to deliver all of said bills to the trailing edges of said belts and to direct said bills toward said entrances of said cash box and said money receptacle, said diverter directing said bills toward one of said entrances while directing said bills away from the other of said entrances.

6. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, said cash box and said money receptacles having the said entrances thereof substantially in line with those portions of said belts which lead to said trailing edges of said belts, said diverter having the trailing edge thereof disposed adjacent but intermediate the said entrances of said cash box and said money receptacle and having the leading edge thereof extending toward said trailing edges of said belts, and a control device, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to move distances equal to the linear distances along the surfaces of said belts from said leading edges to said trailing edges of said belts, said control device and said member selectively disposing said diverter in said one or said second position, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing bills away from the other of said entrances.

7. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, said cash box and said money receptacle having the entrances thereof disposed below the levels of the trailing edges of said belts, said diverter being movable to one position to block said entrance of said cash box and to unblock said entrance of said money receptacle, said diverter being movable to a second position to block the entrance of said money receptacle and to unblock said entrance of said cash box, and a control device, said control device being adapted to energize said motor for short periods of time to enable said belts to grasp the leading edges of bills accepted by said currency detector and to move said bills away from said outlet of said currency detector distances just slightly greater than the lengths of said bills, said control device also being adapted to energize said motor for periods of time that are long enough for said belts to move distances equal to the linear distances along the surfaces of said belts from said leading edges to said trailing edges of said belts, said control device and said member selectively disposing said diverter in said one or said second position, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

8. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, said cash box and said money receptacle having the entrances thereof disposed below the levels of the trailing edges of said belts, said cash box and said money receptacles having the said entrances thereof substantially in line with those portions of said belts which lead to said trailing edges of said belts, said diverter having the trailing edge thereof disposed adjacent but intermediate the said entrances of said cash box and said money receptacle and having the leading edge thereof extending toward said trailing edges of said belts, said diverter being movable to one position to block said entrance of said cash box and to unblock said entrance of said money receptacle, said diverter being movable to a second position to block the entrance of said money receptacle and to unblock said entrance of said cash box, and a control device, said control device being adapted to energize said motor for short periods of time to enable said belts to grasp the leading edges of bills accepted by said currency detector and to move said bills away from said outlet of said currency detector distances just slightly greater than the lengths of said bills, said control device also being adapted to energize said motor for periods of time that are long enough for said belts to move distances equal to the linear distances along the surfaces of said belts from said leading edges to said trailing edges of said belts, said control device and said member selectively disposing said diverter in said one or said second position, said belts being adapted to receive a plurality of bills and to hold said bills in tandem with the leading edges of said bills spaced short distances rearwardly of the trailing edges of preceding bills, said belts being adapted to deliver all of said bills to the trailing edges of said belts and to direct said bills toward said entrances of said cash box and said money receptacle, said diverter directing said bills toward one of said entrances while directing said bills away from the other of said entrances.

9. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding the greater portions of the lengths of said belts in intimate confronting engagement, said pulleys providing a serpentine configuration for parts of said belts, a motor to drive said belts, a diverter, a member to move said diverter, said diverter being movable to one position to block said entrance of said cash box and to unblock said entrance of said money receptacle, said diverter being movable to a second position to block the entrance of said money receptacle and to unblock said entrance of said cash box, and a control device, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to move distances equal to the linear distances along the surfaces of said belts from said leading edges to said trailing edges of said belts, said belts being adapted to deliver all of said bills to the trailing edges of said belts and to direct said bills toward said entrances of said cash box and said money receptacle, said diverter directing said bills toward one of said entrances while directing said bills away from the other of said entrances.

10. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor to drive said belts, a diverter, a member to move said diverter, and a control device, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to move distances equal to the linear distances along the surfaces of said belts from said leading edges to said trailing edges of said belts, said belts being adapted to deliver all of said bills to the trailing edges of said belts and to direct said bills toward said entrances of said cash box and said money receptacle.

11. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elongated belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confronting engagement, a motor that is adapted to drive said belts short distances and thereby enable said belts to receive bills from said currency detector and to thereby temporarily hold those bills and that is subsequently adapted to drive said belts longer distances to transfer said bills from said belts to said cash box, a diverter, a member to move said diverter, said diverter being adapted to intercept bills that tend to curl and to move away from said cash box or said money receptacle.

12. An escrow that can be disposed adjacent the outlet of a currency detector and that can receive and temporarily hold bills accepted by said currency detector and that can subsequently deliver said bills to the cash box or money receptacle of a vending machine and that comprises an elongated belt that has its leading edge disposed adjacent said outlet of said currency detector, a second elonagted belt that has its leading edge disposed adjacent said outlet of said currency detector, pulleys that support said belts and that permit said belts to move relative to each other and relative to said currency detector and said cash box and said money receptacle, said pulleys holding portions of the lengths of said belts in intimate confront engagement, a motor that is adapted to drive said belts short distances and thereby enable said belts to receive bills from said currency detector and thereby temporarily hold those bills and that is subsequently adapted to drive said belts longer distances to transfer said bills from said belts to said cash box, a diverter, a member to move said diverter and a control device, said control device being adapted to energize said motor for short periods of time to enable said belts to grasp the leading edges of bills accepted by said currency detector and to move said bills away from said outlet of said currency detector short distances, said control device also being adapted to energize said motor for periods of time that are long enough for said belts to deliver all of the bills held thereby to said diverter.

References Cited in the file of this patent

UNITED STATES PATENTS

| | | |
|---|---|---|
| 1,697,220 | Anstiss | Jan. 1, 1929 |
| 2,795,312 | Howdle | June 11, 1957 |

FOREIGN PATENTS

| | | |
|---|---|---|
| 549,067 | Great Britain | Nov. 4, 1942 |